UNITED STATES PATENT OFFICE 2,069,919

PRINTING PROCESS

Richard Walter Hardacre and Alec Wormald, Blackley, Manchester, England, assignors to Imperial Chemical Industries Limited, a corporation of Great Britain No Drawing. Application October 24, 1934, Serial No. 749,820. In Great Britain November 2, 1933

6 Claims. (Cl. 8—5)

This invention relates to printing certain azo dyes in the same pattern with vat dyes, and more particularly to printing dyes of the so-called "Rapid Fast" and/or "Rapidogen" type along with vat dyes.

As defined by C. M. Whittaker, "Dyeing with Coal Tar Dyestuffs" (1920), page 92, the expression "Rapid Fast dyes" is the name given to stable mixtures of nitrosamine alkali salts and naphthanils, such as Naphthol AS. This type of dye, which is usually referred to as the nitrosamine type, has been known for some time. The so-called "Rapidogen" type of dye is also an azo dye but usually consists of mixtures of water-soluble diazoimino derivatives of naphthanil bases and naphthanils.

The usual method for the production of printed patterns on cellulose materials by the use of dyes of the Rapid Fast and/or Rapidogen type along with vat dyes is to apply the dyes in the normal manner, age the printed goods to fix the vat dye and finally give the goods an acid treatment to develop the Rapid Fast or Rapidogen dyes.

Unfortunately, during the steaming process various gases are liberated (such as formaldehyde from the sodium sulfoxylate-formaldehyde compound used as the reducing agent for the vat dye) which have a deleterious action on the undeveloped Rapid Fast or Rapidogen dye with the result that during the subsequent acid treatment only a partial development of the Rapid Fast or Rapidogen dye ensues, the resulting shade being weak and flat.

It is an object of this invention to provide a new and improved method of printing azo dyes of the type above described along with vat dyes. A further object is to provide a method of printing azo dyes of the type above described in the same pattern with vat dyes, whereby stronger and brighter prints are obtained than by the methods ordinarily employed. Other objects will appear hereinafter.

In accomplishing these objects according to the present invention, we have found that new and improved results may be obtained by applying the vat color in a paste with ferrous sulfate and a small amount of stannous chloride while applying the azo color in the usual way, and then after drying, aging the prints in an acid atmosphere to develop the insoluble azo color and subsequently over-printing or nip-padding the print with caustic soda, thereafter drying and again steaming.

The invention will be further understood but is not limited by the following example, in which the parts are by weight.

Example

An azo color paste is prepared according to the following recipe:

| | Parts |
|---|---|
| Brenthol Fast Red GLS paste or Rapid Fast Red GL paste (this color is a mixture of the nitrosamine from meta-nitro-para-toluidine and the anilide of 2:3-hydroxy naphthoic acid) | 10 |
| Water | 27 |
| Wheat starch tragacanth thickening | 60 |
| Sodium salt of meta-nitrobenzene sulfonic acid | 3 |
| | 100 |

A vat dyestuff paste is prepared according to the following recipe:

| | Parts |
|---|---|
| Caledon Jade Green XS paste fine (Color Index No. 1101) (also known as dimethoxy dibenzanthrone) | 10 |
| Thickening (British gum) | 60 |
| Water | 21 |
| Ferrous sulfate | 4 |
| Tartaric acid | 4 |
| Stannous chloride solution (1:1) | 1 |
| | 100 |

The printing pastes prepared from the azo color components and the vat color are printed on cotton to give two color effects from different rollers. The cotton is dried and then aged in steam containing acetic acid vapor for two to four minutes at 100° C.

The goods are then over-printed with a strong caustic soda paste, prepared according to the following recipe:

| | Parts |
|---|---|
| Caustic soda 90° Tw | 1720 |
| Indian corn starch | 80 |
| Alkaline gum | 200 |

Boil for twenty minutes and add:

| | Parts |
|---|---|
| Mercerizing assistant containing phenol (such as that sold under trade name "Perminal MERC") | 40 |

After drying, the goods are aged for two to five minutes in steam at 100° C. to 102° C.

The goods are then well washed in running water for ten minutes, oxidized with a 0.2% solution of sodium bichromate, again washed in water, and finally soaped at the boil.

By this method bright red and green shades of good tinctorial value are obtained.

Similarly, the invention is applicable to the use of other azo colors of the type described in conjunction with the same or other vat colors. In general, the azo colors contemplated by the invention are of the type obtainable by hydrolizing a water-soluble diazoimino compound with an acid in the presence of an ice color coupling component. The azo color printing pastes are prepared in the usual manner, for example, by mixing together suitable proportions of the water-soluble diazoimino compound and ice color coupling component, adding to the mixture an alkali in sufficient quantity for dissolving the coupling component, and making up the mixture to a printing paste in a manner well known to those skilled in the art by adding thereto a thickening agent such as starch and gum tragacanth and the necessary quantity of water and, if desired, other suitable reagents such as are normally incorporated into printing pastes (for example, Turkey red oil or other suitable dispersing agents).

The water-soluble diazoimino compounds are of the type which may be represented by the following general formulae:

(1) 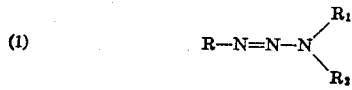

(2) $R-N=N-R_3$ in which R represents an aryl nucleus of the benzene, azobenzene, diphenyl, diphenylamine, naphthalene, carbazole or anthraquinone series containing no water-solubilizing groups such as sulfonic or carboxylic acid groups, but which may contain alkyl, alkoxy, halogen, nitro, benzoylamino and other suitable auxochromic groups; $R_1$ and $R_2$ represent similar or dissimilar radicals such as alkyl, aralkyl, aryl or completely reduced carbocyclic radicals, either $R_1$ or $R_2$ being substituted by one or more groups imparting water-solubility, such as sulfonic acid, carboxylic acid or hydroxy groups; and $R_3$ represents a piperidine or pyrrolidine nucleus containing at least one solubilizing group.

Water-soluble diazoimino compounds of the type described are obtainable by coupling diazo salts of the general formula $R-N_2X$ in which R represents a nucleus as described above and X represents the residue of an acid (e. g., —Cl), with a secondary amine of the general formula

or with a piperidine or pyrrolidine derivative such as described, $R_1$ and $R_2$ having the same significance as before.

The diazo salts of the general formula $R-N_2X$ may be any of the aromatic amines commonly used in the ice color art, for example, any one of the following: 3-nitro-4-aminotoluene, 2:5-dichloroaniline, 4-chloro-2-aminotoluene, 4-chloro-2-amino-anisole, ortho-chloro-aniline, meta-chloro-aniline, para-nitraniline, 1-amino-4-benzoylamino-2:5-diethoxybenzene, 4-chloro-2-nitro-aniline, N-(para-aminobenzoyl)-aniline, ortho-phenetidine-azo-alpha-naphthylamine, para-anisidine - azo - 2:5 - dimethoxy - aniline, alpha-amino-anthraquinone, 3-amino-carbazole, di-anisidine, para-amino-diphenyl, 4:4'-diamino-diphenylamine and 1-amino-2-methoxy-naphthalene.

The secondary amines referred to may be, for example, sarcosine, dibenzylamine-disulfonic acid, 4-sulfo-2-aminobenzoic acid, 1-aminobenzene-2:5-disulfonic acid, 1-methyl-2-ethyl-aminobenzene-4-sulfonic acid, 1-aminonaphthalene-2:4-disulfonic acid, butylamino-acetic acid, cyclohexylamino-acetic acid, 3-aminobenzene-1:2-dicarboxylic acid, 2-methylamino-4-sulfobenzoic acid, pipecolinic acid, piperidine-gamma-sulfonic acid, piperidine-polycarboxylic acids, piperidine-polysulfonic acids, pyrrolidine-alpha-sulfonic acid, pyrrolidine-beta-carboxylic acid and 4:5-dimethyl-pyrrolidine-2-carboxylic acid.

Any of the well known ice color coupling components may be employed in the printing composition. As examples may be given alpha- and beta-naphthol, the various arylamides of 2:3-hydroxy-naphthoic acid such as the anilide, toluidide, halogenated anilides and toluidides, alkoxy- and halogenated alkoxy-anilides; arylamides of hydroxy-carbazole and hydroxy-naphtho-carbazole-carboxylic acids; and arylamides of hydroxy-anthracene and hydroxy-phenanthrene-carboxylic acid.

The vat color employed in the vat color printing paste may be any vat color of the type suitable for printing, including vat colors of the anthraquinone, indanthrone, flavanthrone, pyranthrone, dibenzanthrone, indigo, thioindigo, thionaphthene-acenaphthene indigo, thionaphthene-indolindigo and similar colors. Specific examples of suitable vat colors are monochloro and dichloro-indanthrones, 6:6'-diethoxy-thioindigo, 4:4'-dimethyl-6:6'-dichloro-thioindigo, and 5:7-dibromo-3:2'-indol-thionaphthene-indigo.

The development of the azo color may be effected with any of the acids normally employed for such purposes such as, for example, formic acid or acetic acid. It will be noted that the method of ageing the prints in an acid atmosphere, whereby the development of the azo color and the ageing of the vat color are effected simultaneously, is not the usual method employed since it is customary to first age the printed goods to fix the vat dye and finally give the goods an acid-treatment to develop the azo dye. By the present process, therefore, the azo dye is developed sooner than is usually the case, thereby tending to avoid any deleterious action on the undeveloped azo dye. The result is that the present process enables the production of excellent prints having a vat dye and an azo dye of the type described in the same pattern. The after-treatment with caustic alkali is optional but has usually been found to be advantageous in the preparation of cellulose fabrics.

As many apparent and widely different embodiments of this invention may be made without departing from the spirit and scope thereof, it is to be understood that we do not limit ourselves to the specific embodiments thereof except as defined in the appended claims.

We claim:

1. The process of producing printed textile materials having vat colors and azo colors in the same pattern which comprises printing on a textile material with a printing paste containing a water-soluble diazoimino compound and an ice color coupling component and in the same pattern printing a vat color printing paste containing an insoluble vat color together with ferrous sulfate and a small amount of stannous chloride but not containing an alkali, then developing the azo dye and simultaneously aging the vat dye by subjecting the printed material to the action of steam containing the vapors of a volatile acid, and finally developing the vat dye by treatment with an alkali.

2. The process of producing printed cellulosic textile materials having a vat color and an azo color in the same pattern which comprises printing on the cellulosic textile material with an azo color printing paste containing a water-soluble diazoimino compound and an ice color coupling component and in the same pattern printing a vat color printing paste containing an insoluble vat color and as a reducing agent ferrous sulfate and a small quantity of stannous chloride but not containing an alkali, then drying the textile material containing both the azo color paste and the vat color paste, ageing the print in an acid atmosphere, and then subsequently over-printing the printed material with caustic alkali.

3. The process of producing printed cellulosic textile materials having a vat color and an azo color in the same pattern which comprises printing on the cellulosic textile material with an azo color printing paste containing a water-soluble diazoimino compound and an ice color coupling component and in the same pattern printing a vat color printing paste containing an insoluble vat color tartaric acid, and as a reducing agent ferrous sulfate and a small quantity of stannous chloride but not containing an alkali, then drying the textile material containing both the azo color paste and the vat color paste, ageing the print in an acid atmosphere, and then subsequently over-printing the printed material with caustic soda, drying again, and steaming.

4. The process of claim 2, in which the vat color is dimethoxy-dibenzanthrone.

5. The process of printing textile materials having vat colors and azo colors in the same pattern which comprises printing on a textile material with a printing paste containing an azo color selected from the group consisting of the nitrosamine and water-soluble diazo-imino type azo colors and in the same pattern printing a vat color printing paste containing an insoluble vat color, tartaric acid, ferrous sulfate and a small quantity of stannous chloride but not containing an alkali, then drying the textile material containing both the azo color paste and the vat color paste, ageing the print in an acid atmosphere whereby the azo color is developed and the vat color is aged but not developed, and then subsequently treating the printed material with an alkali in order to effect development of the vat color, drying again and steaming.

6. The process of producing printed textile materials having vat colors and azo colors in the same pattern which comprises printing on a textile material with a printing paste containing an azo color selected from the group consisting of the nitrosamine and water-soluble diazo-imino type azo colors and in the same pattern printing a vat color printing paste containing as a reducing agent ferrous sulfate and a small quantity of stannous chloride but not containing an alkali whereby the vat color is imparted to the fabric in insoluble and undeveloped form rather than as a soluble alkali metal salt, drying the textile material containing the color pastes, then simultaneously developing the azo color and ageing the vat color by ageing the print in an acid atmosphere, subsequently treating the printed material with an alkali forming an alkali metal leuco derivative in order to develop the vat dye.

RICHARD WALTER HARDACRE.
ALEC WORMALD.